F. FAWVER.
BRAKE.
APPLICATION FILED OCT. 7, 1913.
1,135,885.
Patented Apr. 13, 1915.
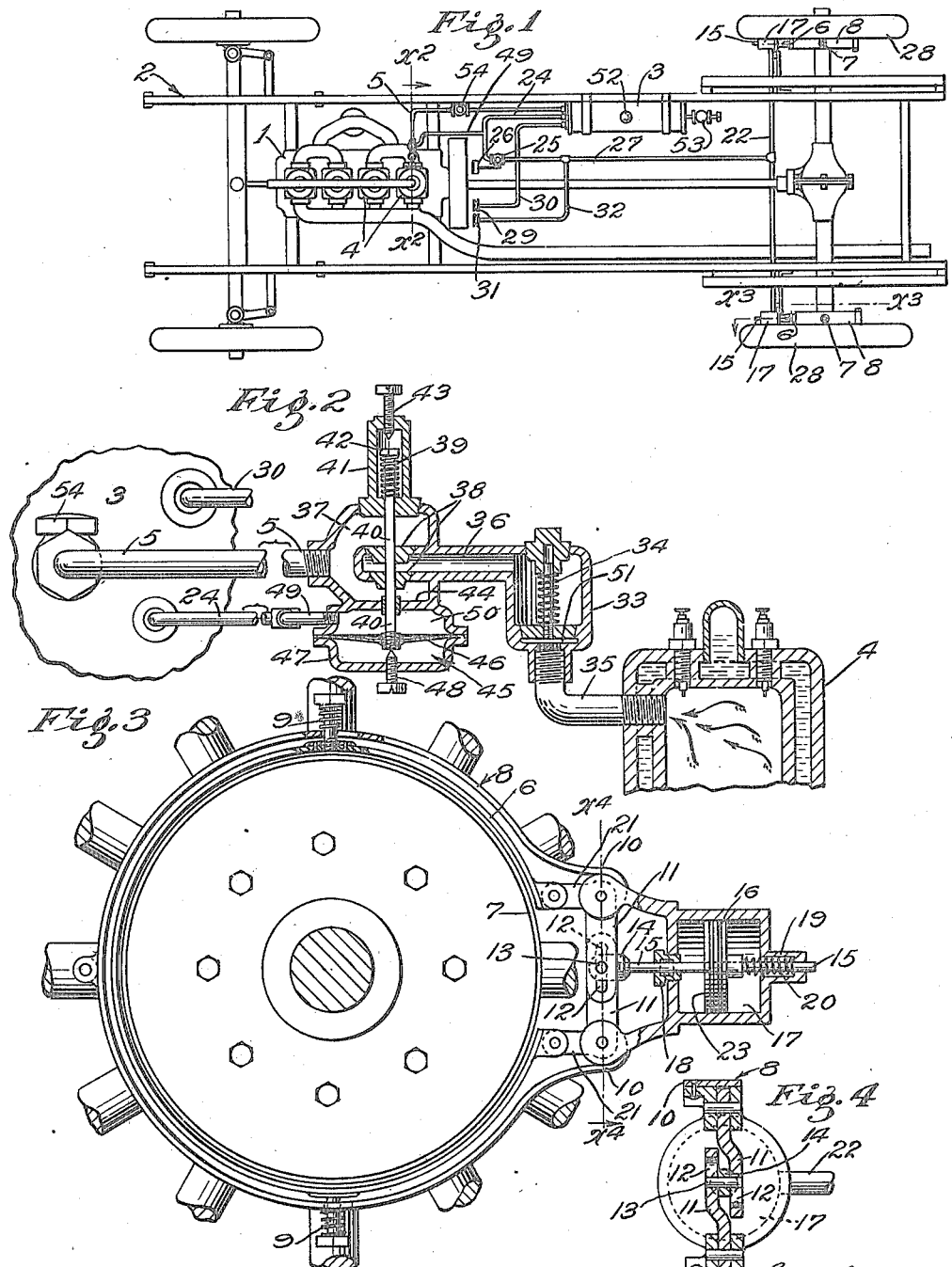

UNITED STATES PATENT OFFICE.

FRANK FAWVER, OF LOS ANGELES, CALIFORNIA.

BRAKE.

1,135,885.

Specification of Letters Patent.

Patented Apr. 13, 1915.

Application filed October 7, 1913. Serial No. 793,975.

*To all whom it may concern:*

Be it known that I, FRANK FAWVER, a citizen of the United States, residing at Los Angeles, in the county of Los Angeles and State of California, have invented new and useful Improvements in Brakes, of which the following is a specification.

This invention relates to the general class of brakes such as are applied to wheels of vehicles, and particularly to wheels of automobiles.

An object of the invention is to provide a brake that is practically instantaneous in its effect when set into braking operation.

Another object of the invention is to provide a brake-actuating means of high power so as to permit absolute non-slipping of the brake when this is desired.

To this end it is a further object to provide a brake controlled by liquid or gaseous substance such as compressed air, or gas under pressure.

It is a still further object to provide a neat, compact and simple arrangement to carry out the principle of this invention.

These and other features, capabilities and advantages will become apparent from a detailed description of one specific embodiment of the invention shown in the accompanying drawings in which—

Figure 1 is a plan of the frame of an automobile equipped with the present improvement. Fig. 2 is an elevation, partly in section, showing the arrangement of tapping the burned gases under pressure from the cylinder of an engine to a reservoir provided with the present embodiment, the view being taken on line $x^2$—$x^2$, Fig. 1, looking in the direction of the arrows. Fig. 3 is an enlarged detail in elevation showing the brake and controlling medium attached to a wheel, portions of the wheel being broken away, the view being taken, partly in section, on line $x^3$—$x^3$, Fig. 1; and Fig. 4 is a section on line $x^4$—$x^4$, Fig. 3.

In the embodiment shown a gas engine 1 is mounted toward the front of a chassis 2 of an automobile in any suitable manner. In the present instance, a reservoir 3 is positioned to one side of the chassis 2 rearwardly of the engine and is connected to one of the cylinders 4 by the pipe connection 5. This connection 5 connects with the cylinder 4, preferably in the upper end of the cylinder, as shown in Fig. 2, and is adapted to convey the burned gas or exhaust of the cylinder to the reservoir 3. This exhaust is under high pressure, and thus particularly adapted to operate the brake arrangement hereinafter to be described. The pressure of this exhaust has been found to serve the best purpose when under pressure of about fifty pounds. To this end the pressure in the reservoir 3 is preferably maintained at this pressure, for which purpose a valve arrangement is provided in the pipe connection 5 between the cylinder 4 and reservoir 3. A brake to be controlled by this arrangement is preferably of the brake band type, as 6, shown in Fig. 3. This brake band 6 is supported between the annular brake drum 7 provided on the side of the wheel and the housing 8 enveloping the same to guard against dust and the like. To maintain the brake band from the brake drum 7 when the brake band is not in operating relation with the brake drum 7 a compression spring arrangement 9 is provided of the usual type, one diametrically opposite the other. The housing 8 has its two ends 10, 10, formed into a pivotal support having bent levers pivoted at their angle to these pivotal supports 10, 10, and each bent lever having one of its arms 11 in slidable and pivotal relation with one of the arms of the other bent lever by means of a slot 12 formed in each of these arms respectively in which rides a pin 13 having its ends secured in a journal member 14 provided at the end of a piston rod 15 having a piston head 16 which reciprocates in a casing forming the piston chamber 17. A suitable packing arrangement 18 is provided at one end of the chamber 17 surrounding the piston rod 15. The other end of the piston rod 15 is guided in a cylindrical projection 19 provided with a compression spring 20 to normally retain the piston head in a brake band releasing position, the bent levers having their arms 21, 21, pivoted to the ends of the brake band 6 respectively. These bent levers have such a relation with the ends of the brake band that when the arms 11, 11, of the bent levers are moved away from the brake band they will actuate their arms 21, 21 to tighten the brake around the supporting member 7 to brake the wheel, and when the arms 11, 11 are moving toward the brake band they will operate to release the brake from the supporting member. To tighten this brake gas under pressure or the like controlled by the operator is permitted to enter the piston chamber 17 by means of the pipe connection 22 which directs the gas to operate against the face 23 of the piston 16 to move the piston head in a direction away from the brake band 6.

The arrangement of conveying the gas under pressure to the piston chamber 17 is as follows: The pipe connection 24 is tapped from the reservoir 3 and led to a controlling valve 25 which is controlled by the foot-pedal 26, or any other suitable arrangement, such as may be provided at the steering wheel. The controlling valve 25 may be entirely opened or only partly opened according to the distance the foot pedal 26 is depressed whereby the instantaneous stopping or a gradual retardation of the vehicle is made possible. From this valve 25 a pipe connection 27 is provided which communicates with the transverse pipe connection 22. This transverse pipe connection 22 communicates with the piston chamber 17 as is already described. As shown in Fig. 1 the transverse pipe connection 22 communicates with two piston chambers 17, 17, one provided for each of the wheels 28, these piston chambers 17 being identical with the one already described and operating in the same manner.

As already stated it is desirable to retain a certain pressure in the reservoir 3. For this reason a gage 29 is provided communicating with the reservoir 3 by means of the pipe connection 30. The gage 29 indicates the pressure in the reservoir 3 and is preferably positioned so that the driver of the automobile has this before him at all times. Another gage 31 is connected to the pipe connection 27 by means of the pipe connection 32. This gage 31 is preferably positioned in the vicinity of the gage 29. Thus, when these gages indicate that a greater pressure is maintained in the reservoir 3 and conveyed to the piston chamber 17 the gas may be cut off or the pressure otherwise controlled.

The valve arrangement in the pipe connection 5, provided to control the pressure of the gas conveyed to the reservoir 3 forms an important part of the invention. As shown in Fig. 2 an initial valve 33 is provided which is normally retained in closed position by the compression spring 34. The cylinder 4 has a pipe communication 35 to this valve 33. The lower face of the valve 33 is provided with a perforated plate 51. Thus, when explosion takes place in the cylinder to convey gas under pressure to the valve 33, this perforated plate will act somewhat in the nature of a cushion to guard against pounding. As the explosion takes place in the cylinder 4 and the pressure rises sufficiently to overcome the tension of the spring 34 valve 33 is opened and the gas under pressure is conveyed through the conduit 36 and into the chamber 37 through the valves 38, 38, and from the chamber 37 it is conveyed through the pipe connection 5 to the reservoir 3. The valves 38 are normally maintained in open position by means of the tension spring 39 which is mounted on the common valve stem 40 of these valves 38, 38, and contacts at its lower end with the bottom of a housing 41, screwed into the top of the chamber 37 and abuts at its upper end against the projection 42 provided at the upper end of the valve stem 40. The upper face of the projection 42 is formed to abut against the end of the pin 43 which is adjustably secured in the upper end of the housing 41. By means of this adjustable pin 43 the size of the opening of the valves 38 is controlled. The chamber 37 is provided at its lower end with a partition 44 to separate it from a diaphragm chamber 45, which diaphragm chamber is provided with a diaphragm 46 to form the lower wall of a regulating compartment. The diaphragm 46 may be made of leather, copper or any other suitable substance. The lower wall of the diaphragm chamber is a shell 47 provided with a pin 48 located centrally thereof, and projecting inward to limit the downward movement of the diaphragm 46. In the present instance, the valve stem 40 is connected to the center of this diaphragm 46, and projects through the same to form an abutment to receive the end of the pin 48. The function of this diaphragm is to close the valves 38 when the pressure being conveyed to the reservoir 3 rises above the desired point. To do this a communication is tapped into the pipe connection 24, for instance, by means of the pipe 49, which conveys the gas from such pipe connection 24 to the regulating chamber 50 above the diaphragm 46. The valves 38 as already stated are normally raised in an open position and while so raised, by means of the valve stem 40 maintain the diaphragm 46 in an upward bulging position. The diaphragm is so regulated with respect to the valve stem and valves that when the pressure of the gas rises above the desired point, as for instance, fifty pounds, this gas pressure will depress the diaphragm 46 thereby lowering the valve stem 40, and thus closing the valves 38. In this manner, the valves 38 will be retained in their closed position until the pressure again reduces to the proper point.

Two valves 38 are provided to permit an easy closing and opening of the valves, one tending to counter-balance the other. Obviously, if these valves 38 were of the same size and diameter a neutral point would be present and when the valves were closed, a force exercised in the pipe communication 36 by pressure of the gas would not be able to open the valves. For this reason the upper valve, or the one opening outward, is made of greater size and diameter than the lower or inward moving valve.

To further prevent back pressure from the reservoir 3 to the cylinder 4 a check valve 54 is provided in the pipe connection 5.

The operation of the device clearly shown in the foregoing is as follows:—When it is desired to stop the vehicle and tighten the brake band 6 on the supporting member 7 the foot pedal 26 is operated to permit gas to flow through the pipe connection 27 to the piston chamber 17 where it will operate to move the piston head 16, which will move the piston rod 15 to operate the levers. To release the brake band the valve communication 25 is shut off. The reservoir 3 is provided with a suitable safety valve 52 at one end adapted to open when excess pressure is present, and thus to reduce the same in the usual manner. A valve attachment 53 is provided in one end of the reservoir 3. This valve attachment is such that it may be connected to a pneumatic tire to fill the tire with the desired quantity of compressed air. Obviously, this valve attachment may also be adapted to connect with an automobile horn or other signaling means to operate the same, or else a plurality of such valve attachments may be provided, by means of which the compressed gas in the reservoir 3 may be utilized as a source of power or to fill pneumatic tires. The compressed gas in the reservoir could also be used as a source of power for operating an engine starter.

It is obvious that various changes and modifications may be made in the details of the construction without departing from the general scope of this invention.

Having thus described my invention what I claim is:

In combination, a brake-drum, a housing enveloping the brake-drum, a brake band between the housing and the drum, a piston chamber attached to the housing, bent levers between the piston chamber and housing pivoted at their bends to the housing and each connected at one end to an end of the brake band, a piston in the piston chamber extending radially with respect to the drum and connected to the other ends of the bent levers respectively, and means to supply compressed fluid to the piston chamber.

In testimony whereof, I have hereunto set my hand at Los Angeles, California, this 2nd day of October, 1913.

FRANK FAWVER.

In presence of—
　JAMES R. TOWNSEND,
　GUSTAV DREWS.